March 27, 1951 R. D. DÛY 2,546,358
FORCED CIRCULATION HOT-WATER HEATING SYSTEM
Filed July 23, 1948
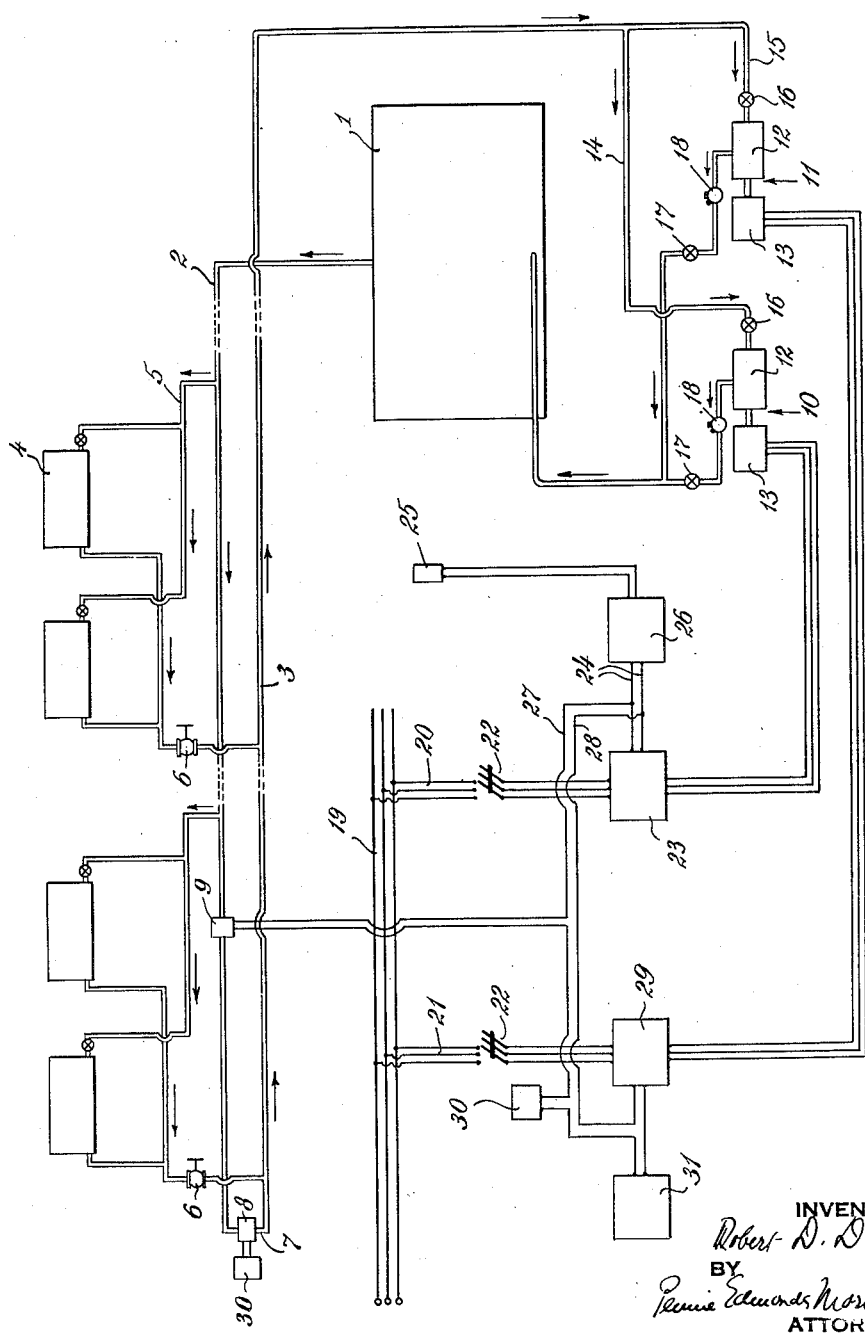
INVENTOR
Robert D. Dûy
BY
Pennie Edmonds Morton Barrows
ATTORNEY Patented Mar. 27, 1951

2,546,358

UNITED STATES PATENT OFFICE 2,546,358

FORCED CIRCULATION HOT-WATER HEATING SYSTEM

Robert D. Dûy, Mendham, N. J.

Application July 23, 1948, Serial No. 40,206

4 Claims. (Cl. 237—8)

This invention relates to hot water heating systems of the forced circulation type, which include a plurality of radiators at different distances for the hot water boiler, supply and return lines, to which the radiators are connected, and pumping means for increasing the rate of circulation of the water. More particularly, the invention is concerned with a novel forced circulation hot water heating system, which provides improved distribution of the hot water and more nearly uniform heating of the rooms, in which the radiators of the system are situated.

The heating system of the invention may be advantageously employed for various purposes and a form of the system used for heating a group of garden apartments is typical. In such a system, the heating plant is disposed at a suitable central location and the hot water is led to the apartment units through a supply line and brought back to the heater through a return line paralleling the supply line. The radiators in each apartment in the group are then connected in one or more branch circuits across the supply and return lines, and each such branch circuit may be a one-pipe lay-out, in which the water flows through a number of radiators in series, or a two-pipe lay-out, in which the water flows to the return line directly from each radiator, or the branch circuits may involve both types of lay-out.

Prior heating systems of the type described are controlled in various ways, as, for example, the circulating pump may operate continuously and a thermostat responsive to outside atmospheric temperature may be employed to mix part of the water returning to the boiler with the hot water leaving the boiler to temper the latter. This method of control is objectionable because of the cost of power for continuous operation of the pump and of the difficulty of obtaining a proper mixture of the return water and the hot water leaving the boiler. In another prior system, the pump operates continuously and the flow of hot water to the radiators in an apartment is controlled by a valve operated by a thermostat in one of the rooms of the apartment. This form of system is expensive to operate because of the continuous operation of the pump and, in addition, the tenants may tamper with and injure the thermostats in their apartments. Also, if the valve for controlling the flow to a particular apartment should fail in closed position, the radiators and connections in that apartment are liable to freeze up. In a third form of the system, the pump is started and stopped by a thermostat in a room of one of the apartments, and this arrangement is objectionable because of the possibility of tampering with the thermostat. In addition, when the pump starts operating, the apartments near the boiler room are heated more quickly than those farther away and, when the far apartments have been heated to the desired temperature, the near apartments have been overheated. Tampering with the thermostat in such a system can be avoided by employing a thermostat exposed to outside temperature, but this does not overcome the non-uniform heating of the apartments.

The present invention is directed to the provision of a forced circulation hot water system, which is so constructed as to overcome the objections to the prior systems, and the new system heats the apartments at a substantially uniform rate, regardless of their distance from the central heating station. In the new system, the circulating means are operated intermittently in response to temperature conditions, but the time required for hot water from the boiler to reach the end of the supply main is greatly reduced, so that all the apartments are heated at approximately the same rate and there is no overheating of those near the central station.

For a better understanding of the invention, reference may be made to the accompanying drawing, which is a diagrammatic lay-out of one form of the system and its controls.

In the system illustrated, water heated in a boiler 1 leaves through a supply main 2, which leads to all the apartments. The water is returned to the boiler through a return line 3, which extends parallel to the supply line from the remote end thereof. The radiators 4 in the various apartments are connected across the supply and return lines by branch connections 5 and, in the system illustrated, the radiators in an apartment are connected in parallel across the lines. A balancing valve 6 is provided in the branch connections for each apartment, so that the flow to the apartments may be equalized.

The end of the supply line remote from the boiler is connected to the return line by a direct connection 7, and flow through this connection is controlled by a valve 8, which may be automatically operated, as will presently be described. A thermostat 9 is mounted in the supply line 2 near the end thereof remote from the boiler and the thermostat responds to the temperature of the water in the line.

The circulation of water through the system is effected by a pair of pump sets generally designated 10, 11. Each pump set includes a pump 12 driven by a motor 13 and the pumps are connected in parallel branch lines 14, 15, which replace a part of the return line 3 near the boiler 1. Each branch line includes gate valves 16, 17 on opposite sides of the pump, and a check valve 18 beyond the pump to prevent return flow therethrough. Under normal conditions, the valves 16, 17 are open and, when both pumps are operating, they combine to circulate water through the boiler and the lines of the system. The check valve beyond each pump prevents water from being returned to that pump by the other pump.

In the system illustrated, the pump motors are supplied with three-phase alternating current from power lines 19 and there are branch circuits 20, 21 for the motors of the respective pump sets 10, 11, each branch circuit having a disconnecting switch 22. The branch circuit 20 leads to a starter 23, which may be of the magnetic type and from which lines 24 lead to a thermostat 25, which responds to atmospheric temperature and is preferably mounted in the open air, although it may be placed within a room in one of the apartments. If desired, the lines 24 may include a program control device 26. Branch lines 27, 28 are connected across lines 24 and lead to a starter 29 for the motor 13 of pump set 11. The thermostat 9 is connected in line 27 and the line may also include a device 30 for opening valve 8 and a timer 31, which opens the circuit after a selected time interval.

The program control device may be of any of the standard commercial types and so constructed that, when the temperature to which thermostat 25 is exposed falls to a selected degree, the program device causes starters 23 and 29 to supply current to the motors of the two pump sets and to shut off the current after a selected time interval. If, after such interval, the temperature to which thermostat 25 responds is unchanged, the device again causes the starters 23, 29 to supply current to the pump motors. The device may be constructed to shut down the system at night, regardless of the temperature to which thermostat 25 is exposed, the device causing the pumps to operate briefly at selected time intervals during the night to prevent the system from freezing. If desired, the program device may be omitted, in which event, the thermostat 25 causes the starters 23, 29 to supply current to the motors, so long as the temperature to which the thermostat is exposed does not rise above a selected degree.

When starters 23, 29 are operated to supply current to the pump motors, either by the program device 26 or by the thermostat 25 operating alone, the motors start to drive the pumps and hot water from the boiler passes out through the supply line 2. The valve 8 controlling the direct connection between the remote ends of the supply and return lines may be opened by the device 30 at the same time that starter 29 is operated to start its motor 13. Under these conditions, the hot water from the boiler can circulate through the supply line, the direct connection, and the return line, so that the entire supply line is quickly filled with hot water for its entire length. As soon as this occurs, the water in the supply line at thermostat 9 reaches the temperature, for which that thermostat is set, and the thermostat opens the circuit to starter 29, so that its pump motor 13 is shut down. At the same time, current to the valve operating device 30 is cut off and valve 8 closes. Thereafter, the system operates with the pump set 10 functioning, until the motor of that set is shut down by the action of the program device 26 or by thermostat 25, when the latter is used alone.

In the system illustrated, the timer 31 operates to open the circuit to starter 29 after a selected interval of operation of pump set 11 and the timer may be used to replace thermostat 9 or in conjunction therewith. If the thermostat 9 is not employed, pump set 11 is shut down by the timer after an interval of operation, which depends on the timer setting and not on the temperature of the water in the supply line at the location of the thermostat. Ordinarily, the timer will be set for a short interval, so that pump set 11 will run only long enough for hot water from the boiler to flow to the end of the supply line. If the timer is not used, the shutting down of pump set 11 depends wholly on the temperature of the water in the supply line at thermostat 9. If both the thermostat and timer are used, one or the other may shut down the pump set, depending upon the circumstances.

The valve 8 controlling the direct connection between the supply and return lines is opened in the system above described by the device 30, whenever pump set 11 is started in operation, and the valve is closed, when the pump set 11 is put out of operation. Instead of controlling the direct connection 7 by an electrically operated valve, the valve connection may be a weighted check valve, which is so adjusted that it is opened by the pressure of the water, when both pumps are operating, but closes, when the pressure falls as a result of pump set 11 being shut down.

In the system described, the pumps are started simultaneously and, when both are operating, the direct connection between the remote ends of the supply and return lines is open. As a result, there is a rapid flow of hot water to the end of the supply line, so that, after a short initial period, all of the apartments are supplied with hot water at the same temperature. After an interval sufficient for the flow of the hot water to the end of the supply line, one of the pump sets is shut down and the direct connection between the supply and return lines is closed. The system then continues to function with one pump in operation under the joint control of thermostat 25 and the program device 26, or of thermostat 25 alone. Both pumps are thus normally employed only for a short initial part of each circulating period, after which circulation is effected by one pump. As the pumps operate intermittently instead of continuously, the cost of the power used is reduced and the cost for power for operating the second pump is thus relatively small. The provision of the second pump is desirable not only to speed up circulation initially but also because if one pump should have to be shut down for repairs, the remaining pump can be used for circulating purposes as in the prior systems. When only one pump is available, suitable changes are made in the electrical circuits, so that that pump will not be stopped by the operation of thermostat 9 or timer 31. Also, during a period of single pump operation, the valve 8 either remains closed or may be operated manually.

I claim:

1. A heating system, which comprises a source of heated fluid, a supply line leading from and a return line leading to the source, a plurality of radiators, branch connections between the radiators and the supply and return lines, respectively, a pair of pump sets including a pair of pumps connected in parallel between the source and one of the lines and operable to cause a flow of fluid from the source through the supply line, a direct connection between the supply and return lines near their ends remote from the source, a valve in said direct connection, means for simultaneously starting both pump sets and opening the valve, and means operating to stop one pump set only and close the valve after an interval approximately sufficient for the flow of the heated fluid from the source to the valve.

2. A heating system, which comprises a source of heated fluid, a supply line leading from and a return line leading to the source, a plurality of radiators, branch connections between the radiators and the supply and return lines, respectively, a pair of pump sets including a pair of pumps connected in parallel between the source and one of the lines and operable to cause a flow of fluid from the source through the supply line, a direct connection between the supply and return lines near their ends remote from the source, a check valve in said direct connection openable by the pressure of the fluid, when both pumps are operating, and shutting off flow when a single pump is operating, means for simultaneously starting both pump sets, and means operating to stop one pump set only after an interval approximately sufficient for flow of the heated fluid from the source to the valve.

3. A heating system, which comprises a source of heated fluid, a supply line leading from and a return line leading to the source, a plurality of radiators, branch connections between the radiators and the supply and return lines, respectively, means connected between the source and one of the lines for causing a flow of fluid from the source through the supply line, said means including a pair of separately operable pump sets, a direct connection between the supply and return lines near their ends remote from the source, a valve in the direct connection, means for simultaneously starting both pump sets and opening the valve, and means operating to stop one pump set only and close the valve after an interval of operation of both pump sets approximately sufficient for the flow of the heated fluid from the source to the valve.

4. A heating system, which comprises a source of heated fluid, a supply line leading from and a return line leading to the source, a plurality of radiators, branch connections between the radiators and the supply and return lines, respectively, means connected between the source and one of the lines for causing a flow of fluid from the source through the supply line, said means including a pair of separately operable pump sets, a direct connection between the supply and return lines near their ends remote from the source, a check valve in the direct connection openable by the pressure of the fluid, when both pump sets are operating, and shutting off flow, when a single pump is operating, means for simultaneously starting both pump sets, and means operating to stop one pump set only after an interval approximately sufficient for flow of the heated fluid from the source to the valve.

ROBERT D. DÛY.

REFERENCES CITED

The following references are of record in the file of this patent:

UNITED STATES PATENTS

| Number | Name | Date |
|---|---|---|
| 2,058,769 | Brown | Oct. 27, 1936 |
| 2,227,349 | Kerrick | Dec. 31, 1940 |
| 2,345,277 | McGrath | Mar. 28, 1944 |
| 2,402,177 | Miller | June 18, 1946 |

FOREIGN PATENTS

| Number | Country | Date |
|---|---|---|
| 442,533 | Great Britain | Feb. 10, 1946 |